United States Patent
Souder (10) Patent No.: US 12,528,419 B2
(45) Date of Patent: Jan. 20, 2026

(54) FISHING ROD AND REEL HOLDER FOR USE INSIDE A VEHICLE

(71) Applicant: Nicholas Souder, Arvada, CO (US)

(72) Inventor: Nicholas Souder, Arvada, CO (US)

( * ) Notice: Subject to any disclaimer, the term of this patent is extended or adjusted under 35 U.S.C. 154(b) by 357 days.

(21) Appl. No.: 18/128,166

(22) Filed: Mar. 29, 2023

(65) Prior Publication Data

US 2023/0309532 A1    Oct. 5, 2023

Related U.S. Application Data

(60) Provisional application No. 63/372,683, filed on Mar. 29, 2022.

(51) Int. Cl.
*A01K 97/10* (2006.01)
*B60R 5/00* (2006.01)
*B60R 7/08* (2006.01)

(52) U.S. Cl.
CPC .............. *B60R 7/08* (2013.01); *A01K 97/10* (2013.01); *B60R 5/006* (2013.01)

(58) Field of Classification Search
CPC ............ A01K 97/10; B60R 2011/0028; B60R 2011/0056; B60R 2011/0068; B60R 5/006; B60R 7/08; B60R 7/10; B60R 7/14; Y10S 224/922; Y10S 224/925; Y10S 224/927
USPC ........................................................ 224/311
See application file for complete search history.

(56) References Cited

U.S. PATENT DOCUMENTS

| | | | |
|---|---|---|---|
| 3,155,299 A | 11/1964 | Horne et al. | |
| 3,524,572 A * | 8/1970 | Hall | B60R 5/006 224/571 |
| 5,544,797 A | 8/1996 | Silva | |
| 5,560,138 A | 10/1996 | Dentsbier | |
| 6,405,909 B1 | 6/2002 | Burnett et al. | |
| D486,779 S * | 2/2004 | Alberti | D12/406 |
| D537,771 S | 3/2007 | Pflieger | |
| 9,565,934 B2 | 2/2017 | Hall, II | |
| 9,862,328 B2 * | 1/2018 | Smith | B60R 7/08 |
| 9,986,827 B1 | 6/2018 | Long | |
| 10,375,945 B2 | 8/2019 | Potts | |

(Continued)

FOREIGN PATENT DOCUMENTS

| | | |
|---|---|---|
| JP | 2008-10557 A | 5/2008 |
| JP | 2020-202758 A | 12/2020 |

(Continued)

OTHER PUBLICATIONS

English Translation of the claims from JP2020202758A, 1 pp.
English Translation of the claims from JP2022103750A, 1 pp.

*Primary Examiner* — Nathan J Newhouse
*Assistant Examiner* — Matthew T Theis
(74) *Attorney, Agent, or Firm* — James A. Sheridan; Sheridan Law, LLC (57) ABSTRACT

There is disclosed a fishing rod and reel holder for securing and transporting a plurality of fishing rods inside vehicles of different sizes. In an embodiment, a front hanger assembly has a plurality of apertures is attached to the windshield by a suction cup. A rear hanger has an internal storage area is suspended from an adjustable rear hanger spreader bar assembly attached to the internal side windows of a vehicle by suction cups. The reel portion of a fishing rod is secured in the rear hanger storage area and the rod tip is secured in one of the front hanger apertures. Other embodiments are also disclosed.

20 Claims, 10 Drawing Sheets

(56) References Cited

U.S. PATENT DOCUMENTS

| | | |
|---|---|---|
| 2014/0346206 A1 | 11/2014 | McKnight et al. |
| 2015/0060378 A1 | 3/2015 | Bestor |
| 2015/0223439 A1 | 8/2015 | Caudle |
| 2017/0113622 A1 | 4/2017 | Smith |
| 2018/0070574 A1 | 3/2018 | Potts |
| 2018/0110210 A1 | 4/2018 | Placko |
| 2018/0265013 A1 | 9/2018 | Beznes |
| 2020/0001796 A1* | 1/2020 | Warren .................... B60R 7/08 |
| 2023/0029189 A1 | 1/2023 | Munoz |

FOREIGN PATENT DOCUMENTS

| | | |
|---|---|---|
| JP | 2020-202769 A | 12/2020 |
| JP | 2022-33674 A | 3/2022 |
| JP | 2022-103750 A | 7/2022 |
| KR | 10-2018-0000479 | 1/2018 |
| KR | 10-2443234 | 9/2022 |

\* cited by examiner

FISHING ROD AND REEL HOLDER FOR USE INSIDE A VEHICLE

REFERENCE TO PENDING PRIOR PATENT APPLICATION

This application claims the benefit under 35 U.S.C. 119 (e) of U.S. Provisional Patent Application No. 63/372,683, filed Mar. 29, 2022 by Nicholas Souder for "FISHING ROD AND REEL HOLDER FOR USE INSIDE A VEHICLE" which patent application is hereby incorporated herein by reference.

BACKGROUND

Field of the Invention

This invention relates generally to fishing rod holders and more particularly to a fishing rod and reel holder that can be secured within different sized vehicles for safe and secure storage and transportation of fishing rods of varying lengths.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an embodiment, there is provided a fishing rod and reel holder that includes a front hanger assembly having a plurality of apertures for receiving fishing rod tip sections. The front hanger assembly may be provided with a clear plexiglass display insert for displaying an advertising logo. A front windshield suction cup is attached to the front windshield suction cup connector of the front hanger assembly to selectively attach the front hanger assembly to the front windshield of a vehicle.

In one embodiment, there is provided an adjustable rear hanger spreader bar assembly that may include a first rear hanger spreader bar tube and a second rear hanger spreader bar tube or, in another embodiment, a solid cylindrical rear hanger spreader bar pole. A first side window suction cup is connected to the first rear hanger spreader bar tube and a second side window suction cup is connected to the second rear hanger spreader bar tube or solid rear hanger spreader bar pole.

In another embodiment, there is provided one or more rear hangers that are suspended from the adjustable rear hanger spreader bar assembly. The rear hanger is provided with an internal storage area. The rear hanger internal storage area is provided with a rod section acceptor to receive and frictionally secure a section of a fishing rod. The rear hanger is also provided with a handle support for supporting the handle of a fishing rod, for example, a flyfishing rod or a spinning fishing rod. A rod channel is provided for receiving and supporting the rod of a spinning fishing rod. The rear hanger is provided with a securing arm for selectively providing access to and for selectively enclosing and securing the rear hanger internal storage area to secure fishing rods in the rear hanger internal storage area.

Other embodiments are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Figure 1:
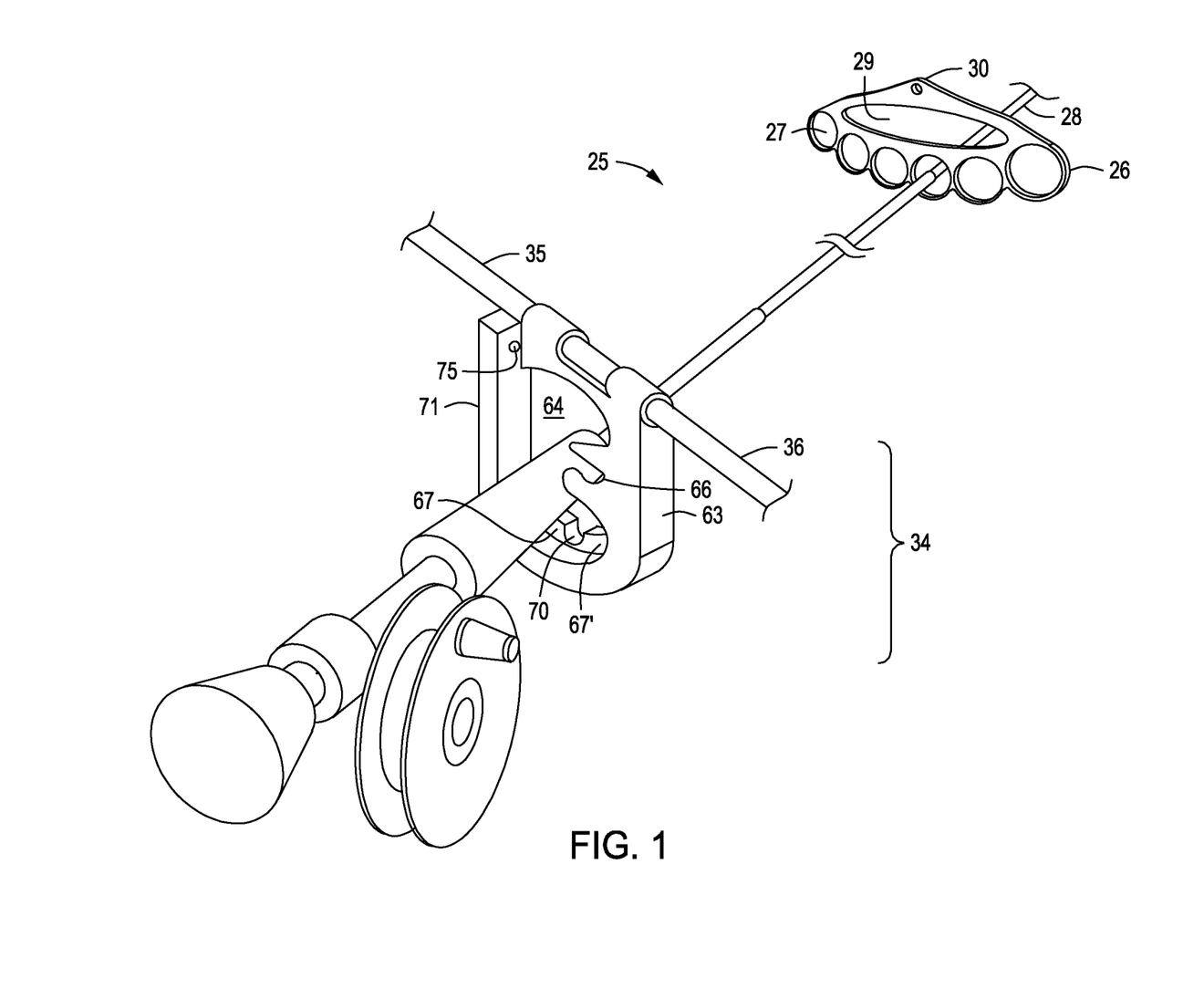
FIG. 1 is a perspective view showing a front hanger assembly, an adjustable rear hanger spreader bar assembly and a fishing rod suspended between and secured in the front hanger assembly and the rear hanger internal storage area.

Referring now to the drawings, there is shown various embodiments of a fishing rod and reel holder 25 for use inside a vehicle. The fishing rod and reel holder 25 includes a front hanger assembly 26 having a plurality of apertures 27 for receiving fishing rod tip sections 28. In an embodiment, the front hanger assembly 26 is provided with six apertures 27 for receiving fishing rod tip sections 28, as shown in FIG. 1. The front hanger assembly 26 may be provided with a clear plexiglass display insert 29 for displaying an advertising logo.

Figure 15:
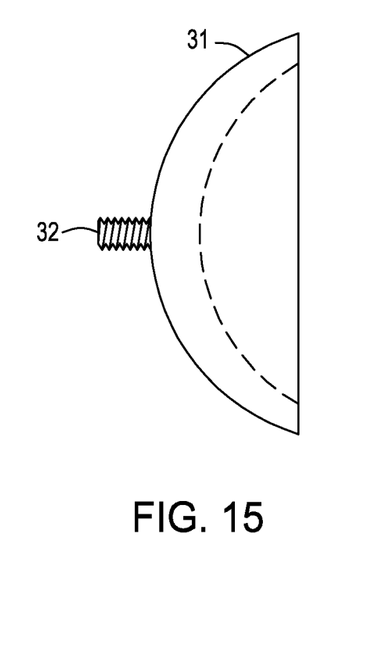
FIG. 15 shows an embodiment of a suction cup with external connecting threads.
Figure 16:
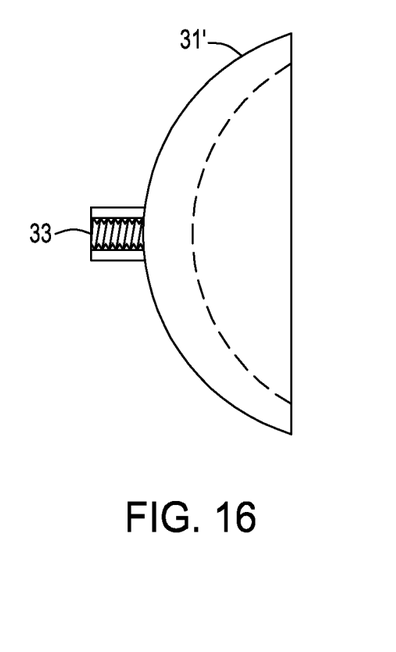
FIG. 16 shows an embodiment of a suction cup with internal connecting threads.
Figure 17:
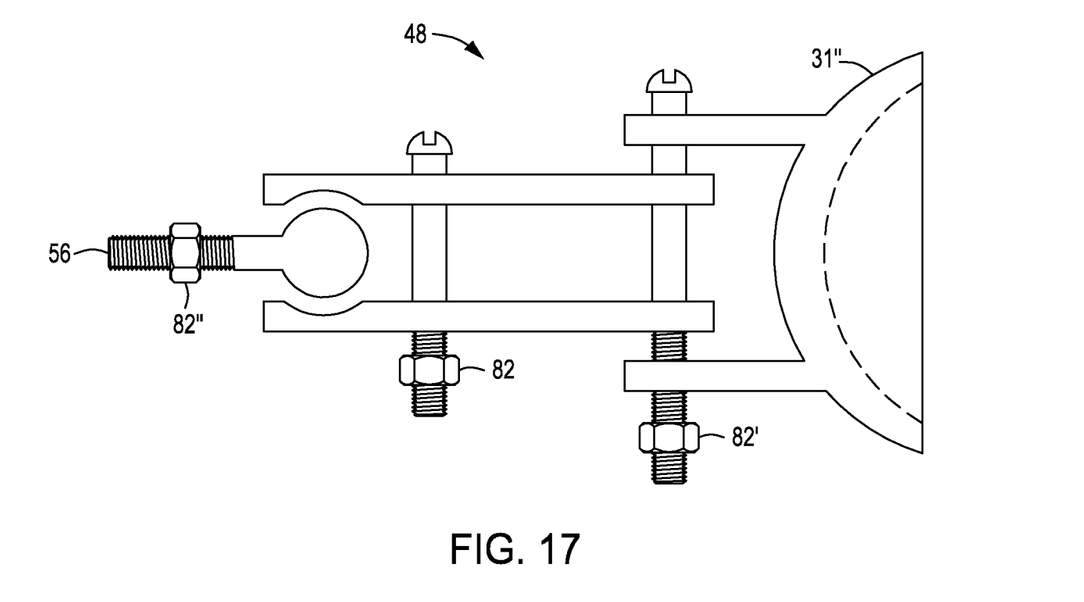
FIG. 17 shows a suction cup integrally attached to a suction cup angle adjuster having external connecting threads.

Suction cups 31, 31' and 31", shown best in FIGS. 15, 16 and 17, are selected to secure the front hanger assembly 26 to the front windshield and also to secure the adjustable rear hanger spreader bar assembly 34 to the side windows of a vehicle.

The front hanger assembly 26 is provided with a front windshield suction cup hanger connector 30 for directly receiving and securing a front windshield suction cup 31 and for receiving and securing a front windshield suction cup angle adjuster 48, 49, 50 having a suction cup 31, 31', or 31" connected to it. A front window suction cup 31, 31', 31" may be directly or indirectly connected to the front windshield suction cup hanger connector 30 to selectively attach the front hanger assembly 26 to the front windshield of a vehicle. The front windshield suction cup 31, 31' may be provided with external threads 32 as shown in FIG. 15 or internal threads 33 as shown in FIG. 16. The front windshield suction cup 31" may also be integral with the suction cup angle adjuster 48 as shown in FIG. 17.

Figure 3:
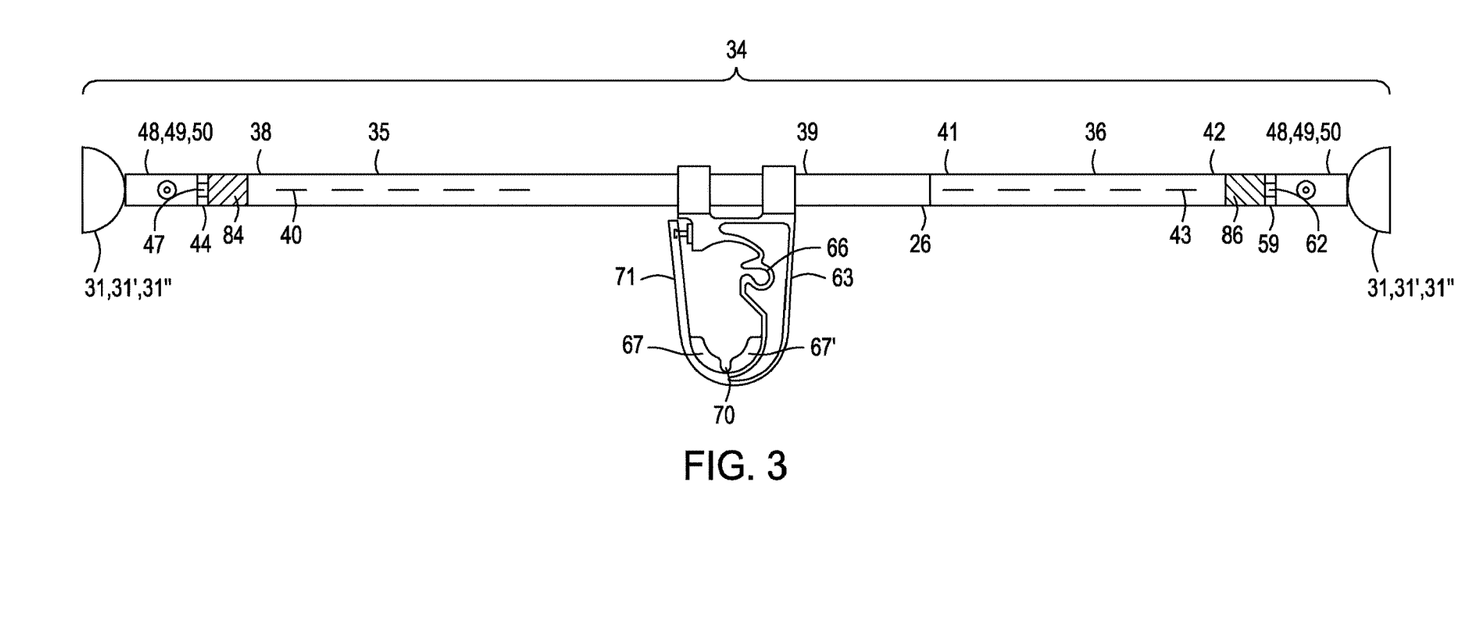
FIG. 3 is a rear view of an adjustable rear hanger spreader bar assembly with a rear hanger suspended from it.

An adjustable rear hanger spreader bar assembly 34, shown best in FIG. 3, may include a first rear hanger spreader bar tube 35 and a second rear hanger spreader bar tube 36. In another embodiment, the second rear hanger spreader bar tube 36 may instead be a solid cylindrical rear hanger spreader bar pole 37 as shown in FIG. 5A.

The first rear hanger spreader bar tube 35 is tubular and has a first end 38 and a second end 39 and a longitudinal bore 40 therethrough. The second rear hanger spreader bar tube 36 is tubular and has a first end 41 and a second end 42 and has a longitudinal bore 43 therethrough. The external diameter 95 of the second rear hanger spreader bar tube 36 and the external diameter 93 of the solid cylindrical rear hanger spreader bar pole 37 is less than the internal diameter 94 of the longitudinal bore 40 of the first rear hanger spreader bar tube 35. This allows the second rear hanger spreader bar tube 36 or the solid cylindrical rear hanger spreader bar pole 37 to be slidably inserted into and out of the longitudinal bore 40 of the first rear hanger spreader bar tube 35.

Figure 11:
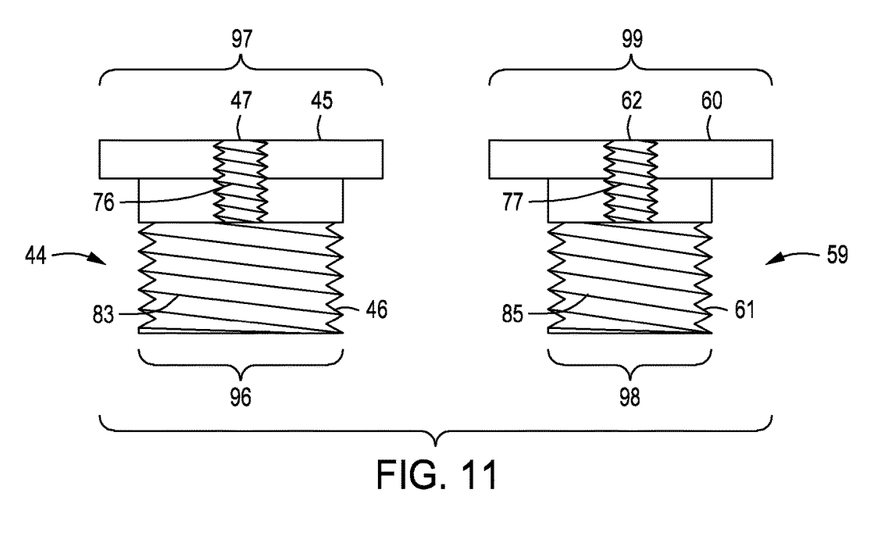
FIG. 11 shows the first and second end caps.

The first rear hanger spreader bar tube 35 is tubular and is provided with a first end cap 44 having a first end 45 and a second end 46, shown in FIG. 11. The second end 46 of the first end cap 44 has an external diameter 96 equal to or less than the internal diameter 94 of the longitudinal bore 40 of the first rear hanger spreader bar tube 35. The first end 45 of the first end cap 44 has an external diameter 97 greater than the internal diameter of the longitudinal bore 40 of the first rear hanger spreader bar tube 35. The second end 46 of the first end cap 44 is inserted into the longitudinal bore 40 at the first end 38 of end cap 44 is provided with a first side window suction cup connector 31, 31', 31". A first side window suction cup 31 may be connected directly to the first side widow suction cup connector 47 or may be connected to a first side window suction cup angle adjuster 48, 49, 50 which is then connected to the first side window suction cup connector 47. The first side window suction cup 31, 31', 31" may be provided with external threads 32 as shown in FIG. 15 or internal threads 33 as shown in FIG. 16 or may be integral with a suction cup angle adjuster 48 as shown in FIG. 17.

Figure 5:
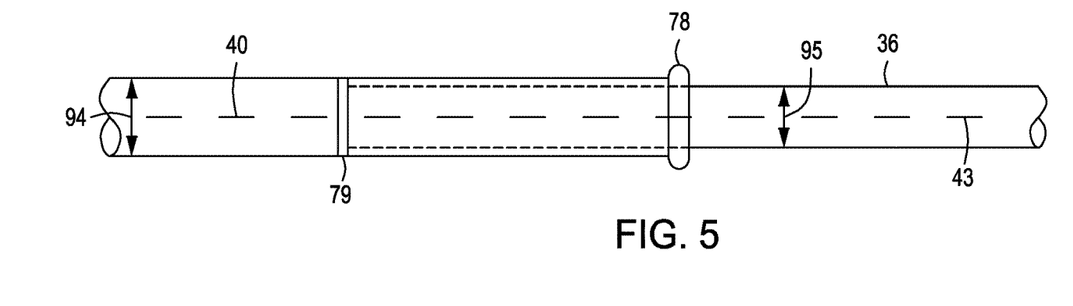
FIG. 5 is a partial side view of the first and second rear hanger spreader bar tubes shown in FIGS. 3 and 4 with the second rear hanger spreader bar tube disposed in the longitudinal bore of the first rear hanger spreader bar tube.
Figure 5A:
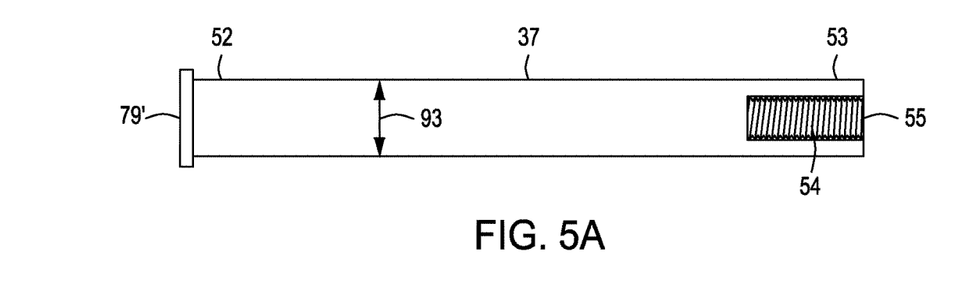
FIG. 5A is a partial side view of an another embodiment in which the second rear hanger spreader bar tube is replaced by a solid cylindrical rear hanger spreader bar pole.

In an embodiment the second rear hanger spreader bar tube 36 may be replaced by a solid cylindrical rear hanger spreader bar pole 37, shown in FIG. 5A, having a first end 52 and a second end 53 and an external diameter 93 less than the internal diameter 94 of the longitudinal bore 40 of the first tubular rear hanger spreader bar tube 35. The second end 53 of the solid cylindrical rear hanger spreader bar pole 37 is provided with internal threads 54 defining a second side window suction cup connector 55 for directly or indirectly connecting a second side window suction cup 31, 31', 31" to the second side window suction cup connector 55 on the solid cylindrical rear hanger spreader bar pole 37. A second side window suction cup 31 may be directly connected to the threads 54 of the second side window suction cup connector 55.

In another embodiment, the second side window suction cup 31, 31' 31" may first be connected directly to a second side window suction cup angle adjuster 48, 49, 50 which is then connected to the internal threads 54 of the second side window suction cup connector 55. The second side window suction cup 31, 31', 31" may be provided with external threads 32 as shown in FIG. 15 or internal threads 33 as shown in FIG. 16. These external threads 32 are matched to mate with and secure the second side window suction cup 31 to the internal threads 54 of the second side window suction cup connector 55 when the second side window suction cup 31 is screwed directly into the second side window suction cup connector 55. In another embodiment, the second side window suction cup 31, 31', 31" may first be connected to a second side window suction cup angle adjuster 48, 49, 50 and the second side window suction cup angle adjuster is then connected to the threads 54 of the second side window suction cup connector 55. The second side window suction cup angle adjuster 48, 49, 50 may be provided with external threads 56, 57, 58 sized and matched to mate with and engage the internal threads 54 of a second side window suction cup connector 55 disposed on the second end 53 of the solid cylindrical rear hanger spreader bar pole 37. The second side window suction cup angle adjuster 48, 49, 50 is then connected to the second side window suction cup connector 55. This allows the distance and angle between the second side window suction cup and the second side window to be adjusted for a more precise fit.

In an another embodiment, the second rear hanger spreader bar tube 36 may be a cylindrical tube having a longitudinal bore 43 and may be provided with a second end cap 59 having a first end 60 and a second end 61, shown in FIG. 11. The second end 61 of the second end cap 59 has an external diameter 98 equal to or less than the internal diameter 95 of the longitudinal bore 43 of the second rear hanger spreader bar tube 36. The first end 60 of the second end cap 59 has an external diameter 99 greater than the internal diameter 95 of the longitudinal bore 43 of the second rear hanger spreader bar tube 36. The second end 61 of the second end cap 59 is inserted into the longitudinal bore 43 at the second end 42 of the second rear hanger spreader bar tube 36. The first end 60 of the second end cap 59 is provided with a second side window suction cup connector 62 for connecting a second side window suction cup 31, 31', 31". A second side window suction cup 31, 31', 31" may be directly connected to the second side window suction cup connector 62, for example, by a frictional or threaded engagement. The second side window suction cup 31 may be provided with external threads 32 as shown in FIG. 15. In another embodiment, the second side window suction cup 31, 31', 31" may first be connected to a second side window suction cup angle adjuster 48, 49, 50 having external threads 56, 57, 58 and the second side window suction cup angle adjuster 48, 49, 50 is then connected to the second side window suction cup connector 62. This allows the distance and angle between the suction cup and the side window to be adjusted for a more precise fit.

Figure 6:
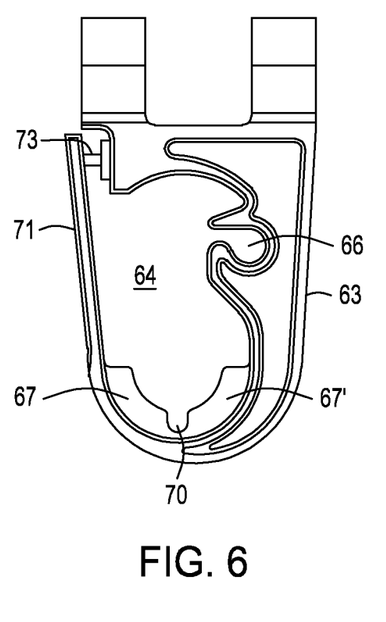
FIG. 6 is a rear view of the rear hanger shown in FIG. 3.
Figure 7:
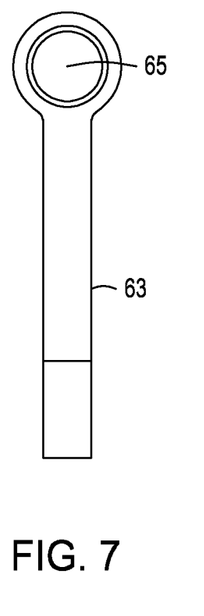
FIG. 7 is a side view of the rear hanger shown in FIGS. 3 and 6.
Figure 12:
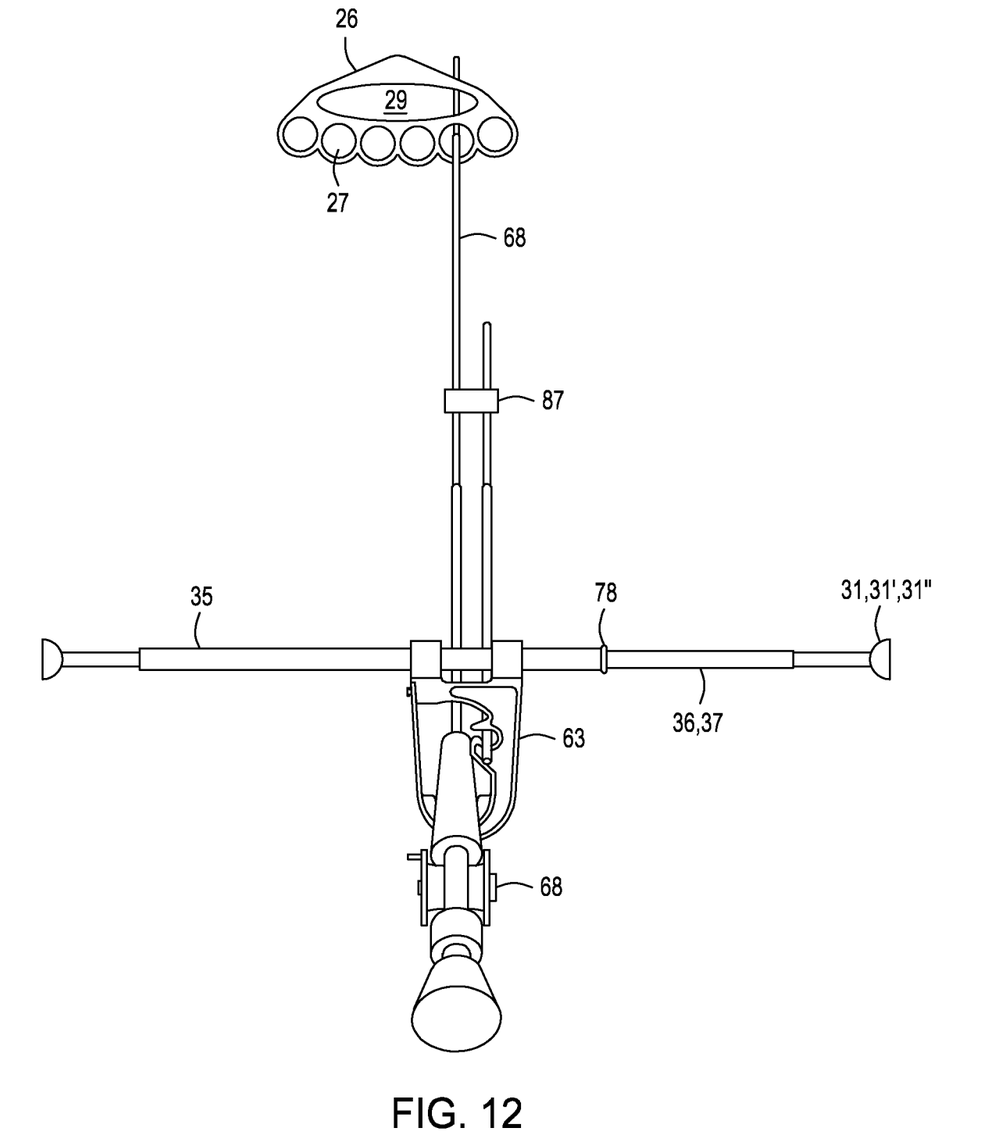
FIG. 12 shows the front hanger assembly and a rear hanger hanging from the adjustable rear hanger spreader bar assembly cooperating to secure a fly fishing rod and reel and a fishing rod section secured by a flexible rod section acceptor clip.
Figure 13:
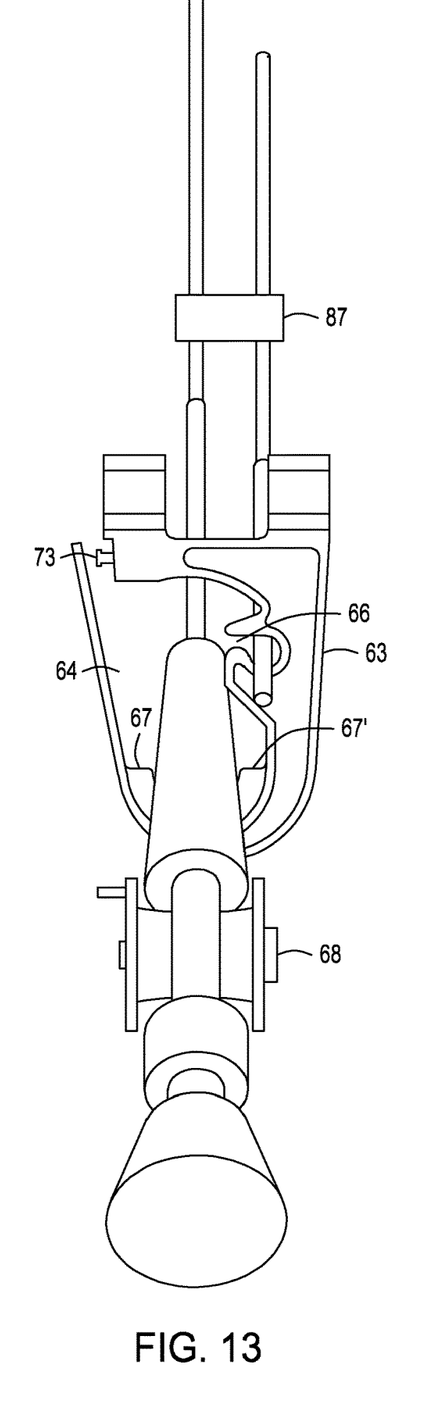
FIG. 13 shows a rear hanger with the securing arm in the first open position storing a fly fishing rod in the rear hanger internal storage area and a fly fishing rod section secured by a rod section acceptor clip.
Figure 14:
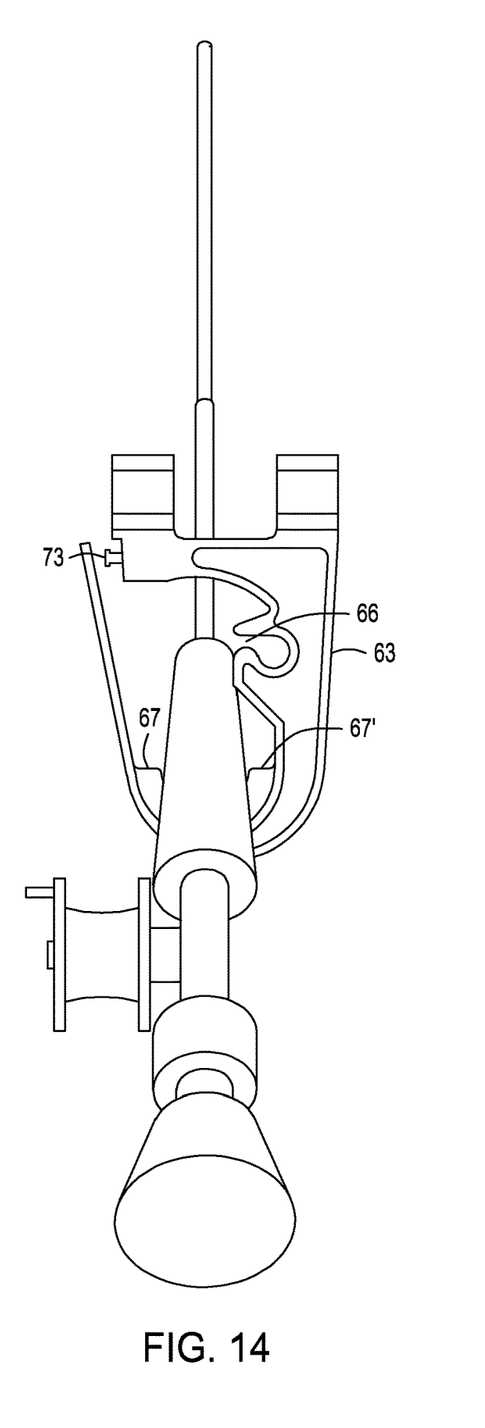
FIG. 14 shows a rear hanger with the securing arm in the first open position storing a spinning fishing rod in the rear hanger internal storage area.

One or more rear hangers 63 are suspended from the adjustable rear hanger spreader bar hanger assembly 34 shown best in FIG. 3. The rear hanger 63, shown best in FIG. 6, is provided with an internal storage area 64. The rear hanger 63 includes at least one tubular channel 65, shown best in FIG. 7, having an internal diameter sized and made of a material selected to receive and frictionally engage and selectively secure the rear hanger 63 on the first rear hanger spreader bar tube 35 of the adjustable rear hanger spreader bar assembly 34, as shown in FIGS. 3, 12, 13 and 14. The internal storage area 64 is provided with a rod section accepter 66 to receive and frictionally secure a section of a fishing rod. As shown in FIGS. 3, 6, 13 and 14, a handle support 67, 67' is provided for supporting the handle of a fly fishing rod 68 as shown in FIGS. 12 and 13 or a spinning fishing rod 69 as shown in FIG. 14. A rod channel 70, shown best in FIG. 6, is provided for receiving and supporting the rod of a spinning fishing rod 69.

Figure 9:
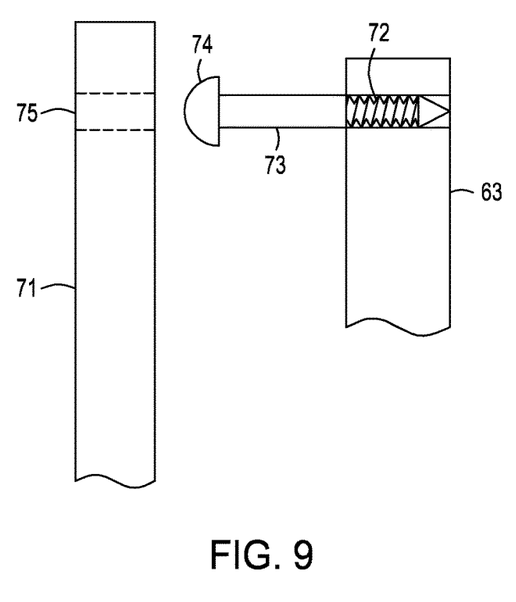
FIG. 9 shows a portion of a securing arm fastener with the securing arm fastener disposed in the first open position.
Figure 10:
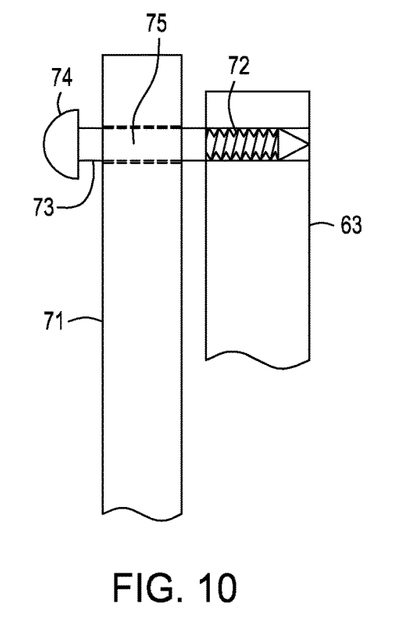
FIG. 10 shows the securing arm fastener shown in FIG. 9 with the securing arm fastener disposed in the second closed position.

The rear hanger 63 is provided with a securing arm 71 for selectively providing access to and selectively enclosing and securing the rear hanger internal storage area 64. The securing arm 71 is movable from a first open position shown best in FIG. 9, to provide access to the rear hanger internal storage area 64 and is moveable to a second closed position, shown in FIG. 10, to secure the rod sections and fishing rods stored in the rear hanger internal storage area 64. A securing arm fastener 72 projects from the rear hanger 63 and selectively secures the securing arm 71 in the closed second position, as shown in FIG. 10. The securing arm fastener 72 may include a securing protrusion 73 having a securing head 74 extending from the rear hanger 63 and a securing arm engaging aperture 75 on the securing arm 71 for selectively engaging and disengaging the securing head 74 of the securing protrusion 73 as shown in FIGS. 9 and 10.

Figure 4:
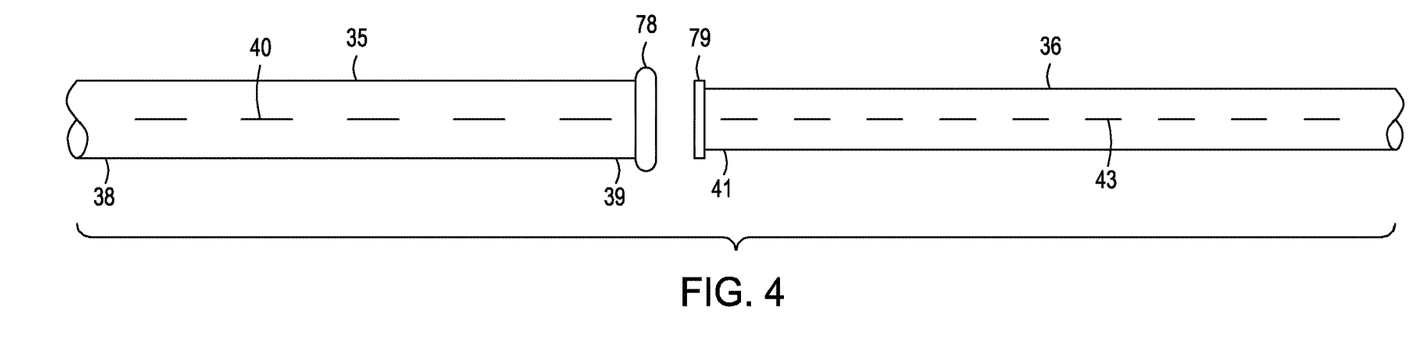
FIG. 4 is a partial side view of the disassembled first and second rear hanger spreader bar tubes shown in FIG. 3.

As shown in FIGS. 4 and 5, the adjustable rear hanger spreader bar hanger assembly 34 may further include a bushing 78 disposed at the second end 39 of the first rear hanger spreader bar tube 35 of the adjustable rear hanger spreader bar assembly 34 and a stopper 79 disposed at the first end 41 of the second rear hanger spreader bar tube 36. A stopper 79' may be disposed at the first end 52 of the solid cylindrical rear hanger spreader bar pole 37 of the adjustable rear hanger spreader bar assembly 34. The bushing 78 and stopper 79 and 79' cooperate to slidably secure the second rear hanger spreader bar tube 36 or solid cylindrical rear hanger spreader bar pole 37 in the longitudinal bore 40 of the first rear hanger spreader bar tube 35 and allow reciprocating movement of the second rear hanger spreader bar tube 36 or the solid cylindrical rear hanger spreader bar pole 37 within the longitudinal bore 40 of the first rear hanger spreader bar tube 35. This allows reciprocating movement of the second rear hanger spreader bar tube 36 or solid cylindrical rear hanger spreader bar pole 37 between the first and second ends 38, 39 of the first rear hanger spreader bar tube 35 to allow for adjustment of the length of the adjustable rear hanger spreader bar assembly 34. This allows the suction cups 31, 31', 31" to be adjusted and placed in secure contact with the side windows of vehicles having varying distances and angles between the internal surfaces of their side windows.

Figure 2:
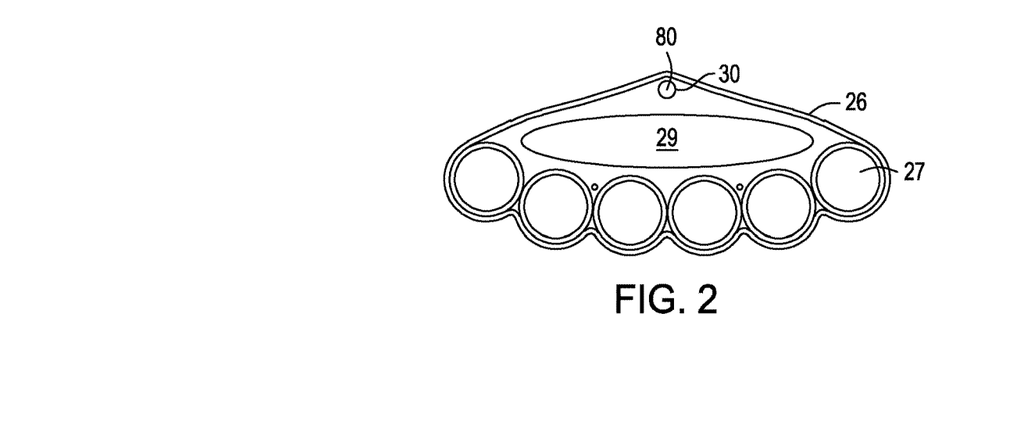
FIG. 2 is a front view of the front hanger assembly shown in FIG. 1.

The front hanger assembly 26 may further include a front suction cup angle adjuster 48, 49, 50 disposed between the front windshield suction cup 31, 31', 31" and the front windshield suction cup hanger assembly connector 30 of the front hanger assembly 26. The front suction cup angle adjuster 48, 49, 50 may be provided with protrusions having external threads 56, 57, 58. The threads 56, 57, 58 are sized to mate with and engage the internal threads 80, shown in FIG. 2, of the front windshield suction cup hanger connector 30 on the front hanger assembly 26. The front window suction cup angle adjuster 50 may be provided with external suction cup threads 91 for engaging the internal threads 33 of a front window suction cup 31' (shown in FIGS. 20 and 21.)

Figure 18:
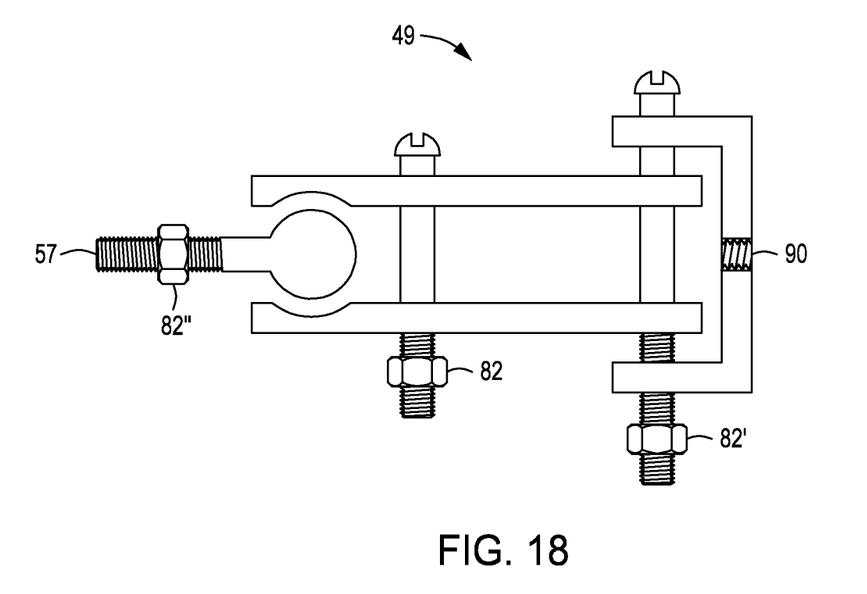
FIG. 18 shows a suction cup angle adjuster having external connecting threads and internal suction cup connecting threads.
Figure 19:
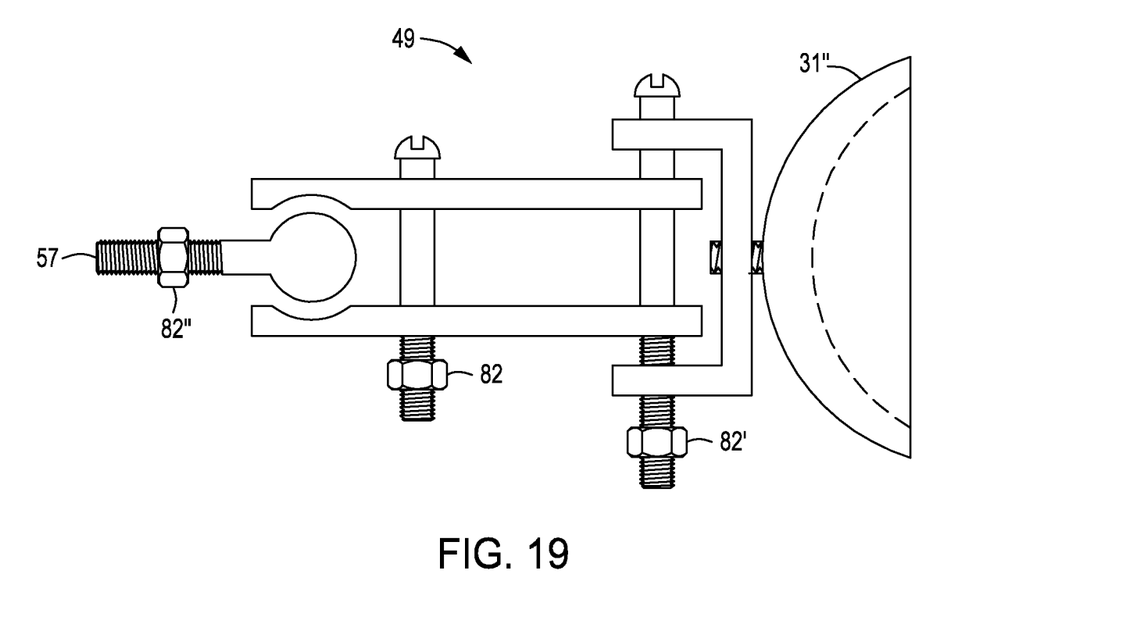
FIG. 19 shows the suction cup of FIG. 15 connected to the internal suction cup connecting threads of the suction cup angle adjuster shown in FIG. 18.
Figure 20:
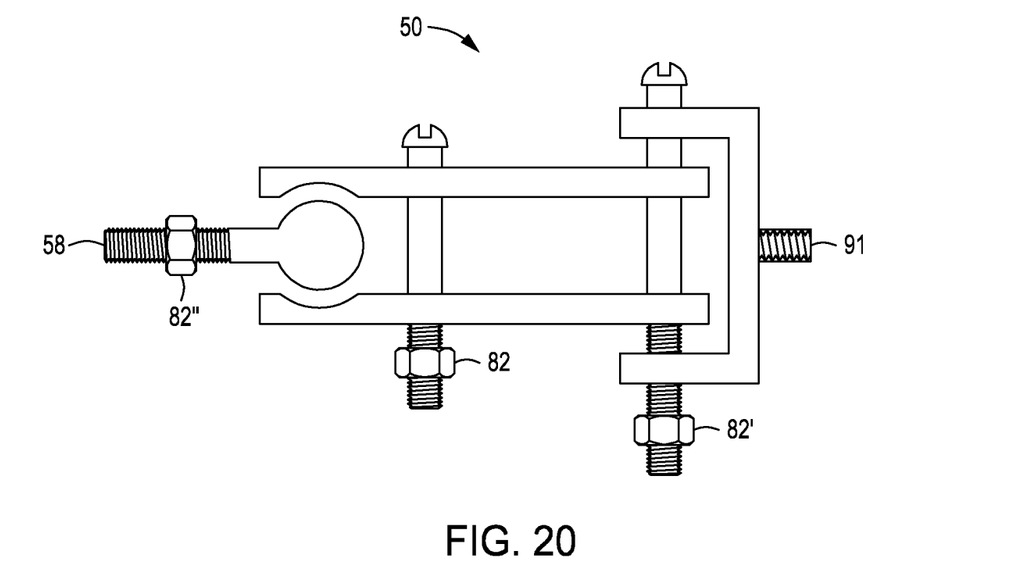
FIG. 20 shows another embodiment of an adjustable suction cup angle adjuster having first external connecting threads and second external suction cup connecting threads.
Figure 21:
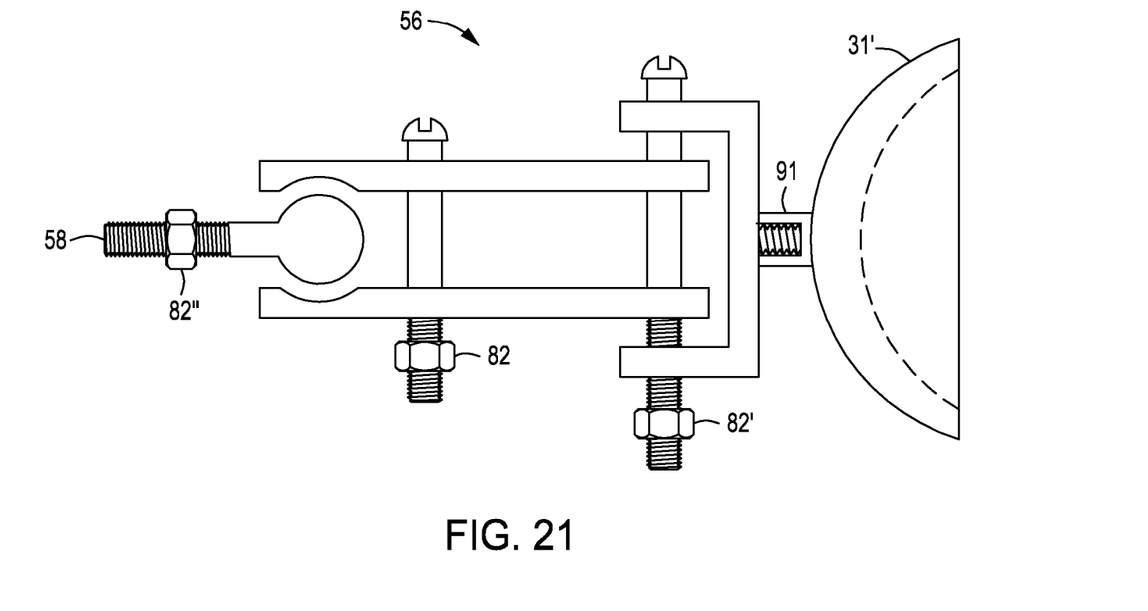
FIG. 21 shows the suction cup shown in FIG. 16 attached to the external suction cup connecting threads of the suction cup angle adjuster shown in FIG. 20.

The front window suction cup 31" may be integral with the front window suction cup angle adjuster 48, as shown in FIG. 17. The suction cups 31 may be selectively attached to the internal suction cup threads 90 of the front windshield suction cup angle adjuster 49 as shown in FIGS. 18 and 19. The suction cup 31' may be selectively attached to the external suction cup threads 91 of the front window suction cup angle adjuster 50 as shown in FIGS. 20 and 21. The front window suction cup angle adjusters 48, 49, 50 facilitate adjustment of the angle that the front window suction cup 31, 31', 31" makes with the front windshield of a vehicle.

The adjustable rear hanger spreader bar assembly 34 may be provided with a first side window suction cup angle adjuster 48, 49, 50 disposed between the first side window suction cup 31, 31', 31" and the first side window suction cup connector 47 on the first end cap 44 to facilitate adjustment of the angle that the first side window suction cup 31, 31', 31" makes with the internal surface of a side window of a vehicle.

The adjustable rear hanger spreader bar assembly 34 may also be provided with a second side window suction cup angle adjuster 48, 49, 50 disposed between the second side window suction cup 31, 31', 31" and the second side window suction cup connector 55, 62 to facilitate adjustment of the angle that the second side window suction cup 31, 31', 31" makes with the side window of a vehicle.

The front window suction cup angle adjuster 48, 49, 50 may be provided with protrusions having external threads 56, 57, 58. The front windshield suction cup hanger assembly connector 30 may be provided with internal threads 80, shown in FIG. 2, sized and matched to mate with and engage the external threads 56, 57, 58 of the front suction cup angle adjuster 48, 49, 50. The external suction cup threads 91 of the suction cup angle adjuster 50 may be sized to mate with and engage the internal threads 33 of suction cup 31'. In another embodiment, the front suction cup angle adjuster 48, 49, 50 and the front hanger connector 30 may be adapted to secure the front window suction cup 31' and the suction cup angle adjuster 48, 49, 50 to the front hanger connector 30 via a frictional engagement or via a male female interlock.

The first side window suction cup angle adjuster 48, 49, 50 may be provided with protrusions having external threads 56, 57, 58. The first side window suction cup connector 47 disposed on the first end 45 of the first end cap 44 may be provided with internal threads 76. The second side window suction cup connector 62 disposed on the first end 60 of the second end cap 59 may be provided with internal threads 77. The second side window suction cup connector 55 disposed at the second end 53 of the solid cylindrical rear hanger spreader bar pole 37 is provided with internal threads 54. The internal threads 76, 77 and 54 are sized and matched to mate with and engage the external threads 56, 57, 58 of the first and second side window suction cup angle adjusters 48, 49, 50 and the external threads 32 of suction cup 31.

In another embodiment, the first and second side window suction cup angle adjusters 48, 49, 50 may be secured in the first side window suction cup connector 47 and the second side window suction cup connectors 55, 62 via a frictional engagement or via a male female interlock.

The suction cup angle adjusters 48, 49, 50 may include two or more hingedly connected portions connected by one or more hinges as shown in FIGS. 17, 18, 19, 20 and 21. A control knob 82" on the suction cup angle adjusters 48, 49 and 50 allows for the suction cup angle adjuster 48, 49, and 50 to be securely attached to the front windshield suction cup hanger connector 30 and the first side window suction cup connector 47 and the second side window suction cup connectors 55, 62. One or more control knobs 82, 82' may be used to adjust the angle between the hingedly connected portions of the suction cup angle adjusters 48, 49, 50 and, thus, permit more precise adjustment of the distance and angle that the suction cups make with the front windshield and side windows of a vehicle.

To more securely attach the first end cap 44 in the first rear hanger spreader bar tube 35, the second end 46 of the first end cap 44 may be provided with external threads 83. The longitudinal bore 40 of the first end 38 of the first rear hanger spreader bar tube 35 may be provided with internal threads 84 sized to match and mate with and engage the external threads 83 of the first end cap 44 when the first end cap 44 is screwed into the first end 38 of the first rear hanger spreader bar tube 35.

To more securely attach the second end cap 59 to the second rear hanger spreader bar tube 36, the second end 61 of the second rear hanger spreader bar end cap 59 may be provided with external threads 85. The longitudinal bore 43 of the second end 42 of the second rear hanger spreader bar tube 36 may be provided with internal threads 86 sized to match and mate with and engage the external threads 85 of the second end cap 59 when the second end cap 59 is screwed into the second end 42 of the longitudinal bore 43 of the second rear hanger spreader bar tube 36.

Figure 8:
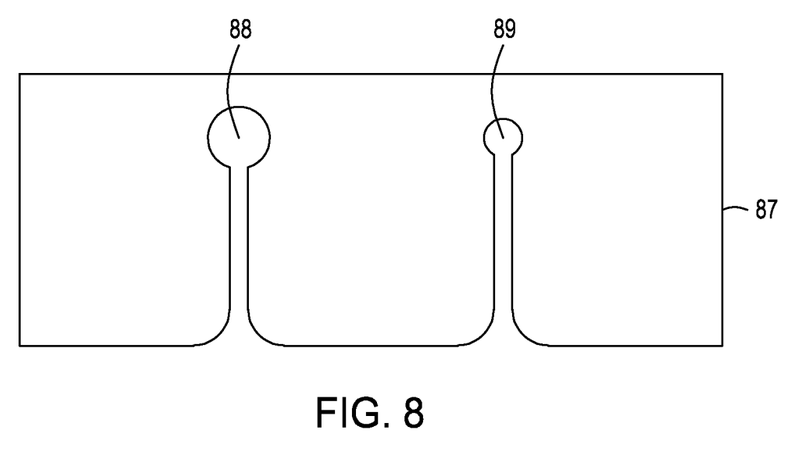
FIG. 8 shows a rod section acceptor clip having first and second securing slots.

The fishing rod and reel holder may further include a flexible rod section acceptor clip 87, shown in FIGS. 8, 12, and 13, having a first rod section securing slot 88 and a second rod section securing slot 89. The rod section securing slots 88, 89 may be sized differently for accepting and securing fishing rod sections of different diameters as shown in FIG. 8.

The front hanger assembly 26, first end cap 44, second end cap 59, front windshield suction cup hanger connector 30, suction cup angle adjusters 48, 49, 50 and adjustable rear hanger spreader bar assembly tubes 35 and 36 and the solid cylindrical rear hanger spreader bar assembly pole 37 may include a variety of materials well known to those skilled in the art as suitable for this purpose, however, in an embodiment these materials are selected from one or more of aluminum, plastic, polyethylene, steel, urethane, and silicone.

The rear hanger 63 and the rod section acceptor clip 87 may include a variety of materials well known to those skilled in the art as suitable for this purpose, however, in an embodiment these materials are selected from one or more of urethane and silicone.

In use, the front window suction cup is attached to the front hanger assembly and the front window suction cup is attached to the front windshield of a vehicle. One or more rear hangers are slid onto the first rear hanger spreader bar tube. The second rear hanger spreader bar tube or the solid cylindrical rear hanger spreader bar pole is inserted into the first rear hanger spreader bar tube. The side window suction cups are attached to the first end of the first rear hanger spreader bar tube and to the second end of the second rear hanger spreader bar tube or to the second end of the solid cylindrical rear hanger spreader bar pole to form the adjustable rear hanger assembly.

To provide for a more precise fit, a suction cup angle adjuster may be disposed between the front windshield suction cup and the front windshield suction cup hanger connector. A suction cup angle adjuster may also be disposed between the first and second side window suction cups and the first and second side window suction cup connectors.

Fishing rods being of varying lengths, the adjustable rear hanger assembly is positioned between the front windshield and the rear of the vehicle at a position so that when a fishing rod is stored between the front hanger assembly and the rear hangers, a fishing rod tip will be secured in one of the plurality of apertures of the front hanger assembly and the handle of the fishing rod will be supported on the handle support in the rear hanger internal storage area. To accommodate the varying distances and angles between the internal surfaces of the vehicle side windows, the second rear hanger spreader bar tube or solid rear hanger spreader bar pole is moved into and out of the longitudinal bore of the first rear hanger spreader bar tube until the first and second side window suction cups make secure contact with the internal surfaces of the side windows.

The handle of a fishing rod is secured on the handle support in the rear hanger internal storage area of the rear hanger and the rod tip is inserted into one of the apertures of the front hanger assembly. If a fishing rod is too long to fit in the interior of a vehicle, a section of the rod is disassembled from the other rod sections and the front portion closest to the rod tip may be secured in one of the apertures of the front hanger assembly The rear portion of the disassembled rod section closest to the handle may be secured in the rod section acceptor in the rear hanger storage area of the rear hanger. For additional security, this disassembled fishing rod section can be snapped into one of the securing slots of the rod section acceptor clip. The other securing slot can be secured to the fishing rod secured in the rear hanger to secure and store both the fishing rod and the disassembled rod section. When the fishing rod and reel and the rod sections are secured in the rear hanger, the rear hanger securing arm is moved to the second closed position to secure the sections in the rear hanger internal storage area. The securing head of the securing protrusion is pushed into the securing arm engaging aperture to secure the securing arm in the closed second position.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A fishing rod and reel holder system configured for use inside a vehicle, the system comprising:
    a front hanger assembly having a plurality of apertures configured to receive fishing rod tip sections therethrough, and a connector to secure the front hanger assembly to a portion of the inside of the vehicle;
    an adjustable rear hanger spreader bar assembly comprising a rear hanger spreader bar tube having a first end and a second end;
    a first connector in operable connection with the first end of the adjustable rear hanger spreader bar assembly, a second connector in operable connection with the second end of the adjustable rear hanger spreader bar assembly, and the first connector configured to secure the first end of the adjustable rear hanger spreader bar assembly in operable connection with a first rear portion of the inside of the vehicle, and the second connector configured to secure the second end of the adjustable rear hanger spreader bar assembly in operable connection with a second rear portion of the inside of the vehicle;
    at least one rear hanger suspended from the adjustable rear hanger spreader bar assembly, the at least one rear hanger having an internal storage area; and
    a handle support disposed in the rear hanger for receiving and supporting the handle of a fly fishing rod or a spinning fishing rod;
    wherein the connector includes a front windshield suction cup hanger connector having internal threads for selectively securing a front windshield suction cup to the front hanger assembly, a front window suction cup connected to the front windshield suction cup hanger connector, and a front windshield is the portion of the inside of the vehicle, so as to allow the suction cup to secure the front hanger assembly to the windshield.

2. The fishing rod and reel holder system of claim 1, further comprising:
    a front windshield suction cup angle adjuster disposed between the front windshield suction cup and the front windshield suction cup hanger connector;
    a first side window suction cup angle adjuster disposed between the first side window suction cup and the first side window suction cup connector on the end cap; and
    a second side window suction cup angle adjuster disposed between the second side window suction cup and the second side window suction cup connector on the second end of the solid cylindrical rear hanger spreader bar pole.

3. The fishing rod and reel holder system of claim 2, wherein the front window suction cup, the first side window suction cup, and the second side window suction cup are provided with protrusions having external threads, the internal threads of the front suction cup windshield hanger assembly connector, the internal threads of the first side window suction cup connector on the end cap, and the internal threads on the second side window suction cup connector on the second end of the solid cylindrical rear hanger spreader bar pole, are sized to mate with and engage the external threads of the front window suction cup and the external threads of the first and second side window suction cups.

4. The fishing rod and reel holder system of claim 3, wherein the front window suction cup angle adjuster, the first side window suction cup angle adjuster, and the second side window suction cup angle adjuster are provided with protrusions having external threads, the internal threads of the front windshield suction cup hanger assembly connector, the internal threads of the first side window suction cup connector on the end cap, and the internal threads on the second side window connector on the second end of the solid cylindrical rear hanger spreader bar pole, are sized to mate with and engage the external threads of the front window suction cup angle adjuster and the external threads of the first and second side window suction cup angle adjusters.

5. The fishing rod and reel holder system of claim 1, wherein the rear hanger includes at least one tubular channel having an internal diameter sized and including a material selected to receive and frictionally engage and selectively secure the rear hanger on the rear hanger spreader bar tube or the solid cylindrical rear hanger spreader bar pole of the adjustable rear hanger spreader bar assembly.

6. The fishing rod and reel holder system of claim 1, further comprising a rod section acceptor disposed in the internal storage area of the rear hanger to engage and frictionally secure a section of a fishing rod.

7. The fishing rod and reel holder system of claim 1, further comprising a rod channel disposed in the rear hanger for receiving and supporting the rod of a spinning fishing rod.

8. The fishing rod and reel holder system of claim 1, further comprising a securing arm attached to the rear hanger for selectively providing access to and selectively securing and enclosing the internal hanger storage area of the rear hanger, the securing arm movable from a first open position to provide access to the internal hanger storage area and moveable to a second closed position to secure the rod sections, spinning fishing rods, and fly fishing rods stored in the internal hanger storage area.

9. The fishing rod and reel holder system of claim 8, further comprising a fastener disposed on the rear hanger for selectively securing the securing arm in the closed second position.

10. The fishing rod and reel holder system of claim 9, wherein the fastener is comprised of a securing protrusion having a securing head extending from the rear hanger and an aperture on the securing arm for selectively engaging and disengaging the securing head of the securing protrusion.

11. The fishing rod and reel holder system of claim 1, further comprising a rod section acceptor clip having first and second rod section securing slots for receiving and securing fishing rod sections.

12. The fishing rod and reel holder system of claim 1, wherein the front hanger assembly is provided with six apertures configured to receive the fishing rod tip sections therethrough.

13. A fishing rod and reel holder system configured for use inside a vehicle, the system comprising:
    a front hanger assembly having a plurality of apertures configured to receive fishing rod tip sections therethrough, and a connector to secure the front hanger assembly to a portion of the inside of the vehicle;

an adjustable rear hanger spreader bar assembly comprising a rear hanger spreader bar tube having a first end and a second end;

a first connector in operable connection with the first end of the adjustable rear hanger spreader bar assembly, a second connector in operable connection with the second end of the adjustable rear hanger spreader bar assembly, and the first connector configured to secure the first end of the adjustable rear hanger spreader bar assembly in operable connection with a first rear portion of the inside of the vehicle, and the second connector configured to secure the second end of the adjustable rear hanger spreader bar assembly in operable connection with a second rear portion of the inside of the vehicle;

at least one rear hanger suspended from the adjustable rear hanger spreader bar assembly, the at least one rear hanger having an internal storage area; and a handle support disposed in the rear hanger for receiving and supporting the handle of a fly fishing rod or a spinning fishing rod;

wherein the rear hanger spreader bar tube includes a longitudinal bore therethrough, and further comprising:

an end cap having a first end and a second end, the second end having an external diameter equal to or less than the internal diameter of the longitudinal bore of the rear hanger spreader bar tube, the first end of the end cap having an external diameter greater than the internal diameter of the longitudinal bore of the rear hanger spreader bar tube, the second end of the end cap inserted into the longitudinal bore at the first end of the rear hanger spreader bar tube, the first end of the end cap provided with an internal threaded recess defining a first side window suction cup connector for connecting a side window suction cup or a first side window suction cup angle adjuster;

a solid cylindrical rear hanger spreader bar pole having a first end and a second end, the second end provided with an internal threaded recess defining a second side window suction cup connector for connecting a second side window suction cup or a second side window suction cup angle adjuster, the external diameter of the solid cylindrical rear hanger spreader bar pole smaller than the internal diameter of the longitudinal bore of the rear hanger spreader bar tube so that the solid cylindrical rear hanger spreader bar pole can be slidably inserted into and out of the longitudinal bore of the rear hanger spreader bar tube;

a first side window suction cup connected to the first side window suction cup connector disposed on the first end of the rear hanger spreader bar tube; and a second side window suction cup connected to the second side window suction cup connector disposed on the second end of the solid cylindrical rear hanger spreader bar pole.

14. The fishing rod and reel holder system of claim 13, further comprising a bushing disposed at the second end of the first rear hanger spreader bar tube of the adjustable rear hanger spreader bar assembly and a stopper disposed at the first end of the solid cylindrical rear hanger spreader bar pole of the adjustable rear hanger spreader bar assembly, the bushing and stopper cooperating to slidably secure the solid cylindrical rear hanger spreader bar pole in the longitudinal bore of the rear hanger spreader bar tube and allow reciprocating movement of the rear hanger spreader bar pole within the longitudinal bore of the cylindrical rear hanger spreader bar tube between the first and second ends of the rear hanger spreader bar tube to allow for adjustment of the length of the adjustable rear hanger spreader bar assembly.

15. The fishing rod and reel holder system of claim 13, further comprising:
- a front windshield suction cup angle adjuster disposed between the front windshield suction cup and the front windshield suction cup hanger connector;
- a first side window suction cup angle adjuster disposed between the first side window suction cup and the first side window suction cup connector on the end cap; and
- a second side window suction cup angle adjuster disposed between the second side window suction cup and the second side window suction cup connector on the second end of the solid cylindrical rear hanger spreader bar pole.

16. The fishing rod and reel holder system of claim 13, wherein the rear hanger includes at least one tubular channel having an internal diameter sized and including a material selected to receive and frictionally engage and selectively secure the rear hanger on the rear hanger spreader bar tube or the solid cylindrical rear hanger spreader bar pole of the adjustable rear hanger spreader bar assembly.

17. The fishing rod and reel holder system of claim 13, further comprising a rod section acceptor disposed in the internal storage area of the rear hanger to engage and frictionally secure a section of a fishing rod.

18. The fishing rod and reel holder system of claim 13, further comprising a rod channel disposed in the rear hanger for receiving and supporting the rod of a spinning fishing rod.

19. The fishing rod and reel holder system of claim 13, further comprising a securing arm attached to the rear hanger for selectively providing access to and selectively securing and enclosing the internal hanger storage area of the rear hanger, the securing arm movable from a first open position to provide access to the internal hanger storage area and moveable to a second closed position to secure the rod sections, spinning fishing rods, and fly fishing rods stored in the internal hanger storage area.

20. The fishing rod and reel holder system of claim 13, further comprising a rod section acceptor clip having first and second rod section securing slots for receiving and securing fishing rod sections.

* * * * *